United States Patent
Lente

[11] 3,865,738
[45] Feb. 11, 1975

[54] METHOD OF MAKING MOTION PICTURES
[76] Inventor: Miklos Lente, 79 Laurentide Dr., Toronto, Ontario, Canada
[22] Filed: Jan. 21, 1974
[21] Appl. No.: 434,868

[52] U.S. Cl................ 352/44, 352/232, 352/239, 352/241
[51] Int. Cl. .......................................... G03b 19/18
[58] Field of Search ......... 352/40, 44, 79, 232, 239, 352/241

[56] References Cited
UNITED STATES PATENTS
3,637,297   1/1972   Yoshida ............................. 352/239
FOREIGN PATENTS OR APPLICATIONS
1,066,419   10/1959   Germany ............................ 352/239

Primary Examiner—Samuel S. Matthews
Assistant Examiner—Russell E. Adams
Attorney, Agent, or Firm—Fetherstonhaugh & Co.

[57] ABSTRACT

A method of making a wide screen motion picture on a 35 mm film comprising the steps of photographing a scene on an original film to provide photographic images having a frame length in the direction of the longitudinal extent of the film no greater than these perforation pitch lengths and repeatedly advancing the original film a distance equal to three perforation pitch lengths and photographing a plurality of successive scenes to provide successive photographic images each having a frame length no greater than three perforation pitch lengths. The film is thereafter processed and finished to provide an original film and print films are prepared from the original film. The print films may be prepared so that they are identical to the original film or they may be prepared such that successive frames of the print film are located at four perforation pitch lengths interval. The images may also have an anamorphic horizontal reduction in the range of 1.5:1 to 1.25:1 and the print films prepared from these original films may have the same anamorphic reduction or they may be longitudinally stretched during the preparation of the print film onto frames of the print film measuring four perforation pitch lengths so as to provide a print film bearing anamorphically longitudinally stretched photographic images having a 2:1 horizontal anamorphic reduction ratio whereby the film may be projected by conventional projectors having an anamorphic optical system of a 2:1 ratio to provide a projected image without anamorphic distortion having a width to height ratio of about 2.35:1.

6 Claims, 8 Drawing Figures

PATENTED FEB 11 1975  3,865,738

METHOD OF MAKING MOTION PICTURES

This invention relates to a method of making wide screen motion pictures. In particular, this invention relates to a method of making wide screen motion pictures on a 35 millimeter film having a plurality of edge perforations disposed at longitudinally spaced intervals along the length of the film and having a perforation pitch length of about 0.1866 (or 0.1870) inches.

For more than 20 years the motion picture industry has been producing wide screen motion pictures using various photographing techniques. The motion picture industry of today has widely adopted two common filming techniques. These techniques include the preparation of film for use in projecting on the anamorphic wide screen 2.35:1 ratio and the flat wide screen 1.85:1 ratio formats. There is a slight difference between conventional North American practice and European practice in that the flat wide screen used extensively in Europe has a ratio of 1.66:1 instead of the 1.85:1 ratio used in North America.

In the preparation of film for use with a screen having a 2.35:1 ratio, it is normal practice to employ a standard four perforation pull down 35 mm. camera with a 2:1 anamorphic optical system which reduces the horizontal component of the scene which is recorded on film. The projection apparatus used in the theatre employs a complementary 2:1 anamorphic optical system so that the horizontal component of the photographic image is increased so that the proportions of the projected image are in accordance with those of the original scene which was filmed.

To achieve the more popular North American 1.85:1 or European 1.66:1 screen format in a theatre from a 35 mm. film two techniques are presently employed. In both cases the 35 mm. camera advances the film strip four perforations for each frame. In one of the systems the camera is adapted to produce a photographic image on the film having a width to length ratio of 1.33:1 which is produced by a camera operating with the standard academy aperture. Because it is necessary to restrict the height of the 1.33:1 ratio photographic image when projecting the image onto a screen requiring a 1.85:1 ratio, it is common practice to employ a mask in the projector gate cutting off the unnecessary top and bottom portions of the image. A similar practice is used with screens employing the 1.66:1 ratio. When using a mask in the projector, the projectionist may not locate the portion of the frame which it was the cameraman's intention to reproduce on the screen, with the result that much of the cameraman's skill can be lost through projectionist error. In order to overcome these problems, it has become practice to use a so-called "hard matte" in the camera in order to record a photographic image on the film which has the correct wide screen ratio so that the projectionist does not have the difficulty of locating the correct framing area.

When a film is prepared using the standard academy aperture in the camera, a substantial portion of the photographic image which appears on the film is unnecessary as it is not projected onto the screen in use. Similarly, when a mask is used in the camera using the four perforation advancing technique for a 35 mm. film, a wide unexposed portion of film extends between each frame. In both of these techniques there is, therefore, a substantial waste of film. In fact, the amount of film used with both of these techniques is 25 percent greater than the combined length of the photographic images and the required spacing between images. In order to produce a film print of 9,000 feet in length, which is a normal budget film, it is common to use about 75,000 to 150,000 feet of original film in the filming cameras. The cost of buying, processing and printing the original film is presently about 50 cents per foot and the cost of producing a film print for the theatre is about 10 cents a foot. It will, therefore, be apparent that a reduction of 25 percent in the length of the film used by the cameras will provide a very significant saving in production costs.

A reduction of 25 percent in the length of film used in the camera will also have the added advantage of reducing the number of occasions on which the cameras must be reloaded. In addition, the storage, transportation and handling problems will be reduced by some 25 percent. There is also a significant decrease in camera noise resulting from the fact that there is a 25 percent reduction in the speed of the film travelling through the camera.

The present invention overcomes the difficulties of the prior art described above and provides a method of making a wide screen motion picture on a 35 mm. film which will effect a 25 percent saving in the amount of film used in the camera and which may also effect a 25 percent saving in the amount of film used in the production of the film prints without adversely affecting the size or quality of the photographic image.

According to an embodiment of the present invention, a method of making a wide screen motion picture on a 35 mm. film having a plurality of edge perforations at longitudinally spaced intervals along the length of the film having a standard perforation pitch length comprises the steps of photographing a scene on an original film to provide a photographic image having a frame length equal to about three perforation pitch lengths and repeatedly thereafter advancing the original film a distance equal to three perforation standard pitch lengths and photographing a plurality of successive scenes, processing and finishing the film and subsequently preparing theatre print films from the original film.

According to the further embodiment of the present invention, the print films are prepared with photographic images printed on successive adjacent frames of three perforation pitch lengths.

According to a still further embodiment of the present invention, a wide screen motion picture film is produced by photographing a scene on an original film with horizontal anamorphic reduction in the range of 1.5:1 to 1.25:1 and a frame length in the direction of the longitudinal extent of the film no greater than three perforation pitch lengths, repeatedly thereafter advancing the original film an equal distance of three perforation pitch lengths and photographing a plurality of successive scenes to provide successive photographic images, each having horizontal anamorphic reduction in the range of 1.5:1 to 1.25:1 and a frame length no greater than three perforation pitch lengths, printing the film to provide a print film having a frame length equal to four perforation pitch lengths and a printed image having a 2:1 horizontal anamorphic reduction whereby the film print may be projected by a conventional projector having an anamorphic optical lens system of a 2:1 ratio to provide a projected image without anamorphic distortion having a width to height ratio of the order of about 2.35:1.

In yet another embodiment of the present invention, print films bearing anamorphically reduced images identical to those of the original film described in the preceding paragraph may be prepared for use in a three perforation pull down projector.

The present invention will be more clearly understood after reference to the following detailed specification read in conjunction with the drawings wherein.

Figure 1:
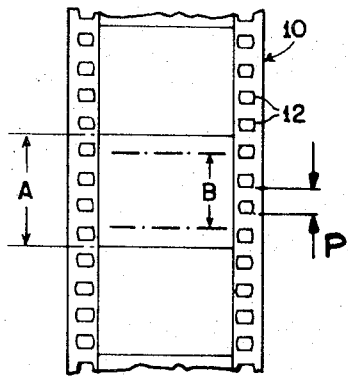
FIGS. 1 to 3 are diagrammatic plan views illustrating film prepared according to embodiments of the prior art.

With reference to the drawings, the reference numeral 10 refers generally to a standard 35 mm. film having a plurality of marginal edge perforations 12 which are used to drive the film in a camera, projector, or the like etc.

The standard 35 mm film is prepared with two widely used standard perforation pitch lengths P.

In one standard film, known in the industry as the "short pitch" film, the perforation pitch P measures about 0.1866 inches and in the other standard film, known as the "long pitch," the pitch P measures about 0.1870 inches. The present invention is applicable to both of these standard pitch lengths and to any other standard pitch length P which may be in use or which may be developed hereafter.

In the prior art illustrated by FIG. 1 of the drawings, the length A is equal to four perforation pitch lengths which is the length of the film which is available for each photographic image in a conventional four perforation pitch system. This length is required in order to accommodate the "full aperture" area of the film. In this embodiment, the length A is equal to four perforation pitch lengths P of the film 10. The length B illustrates the maximum photographic image height necessary for any of the presently used flat wide screen projecting systems, which is about 0.497 inches. It will be understood that in many systems the actual height of the projected photographic image may be somewhat less than 0.497 inches and in fact in the North American system the height of the projected photographic image presently used is about 0.446 inches. It will be apparent that the length of available film is substantially greater than the length of film required.

Figure 2:
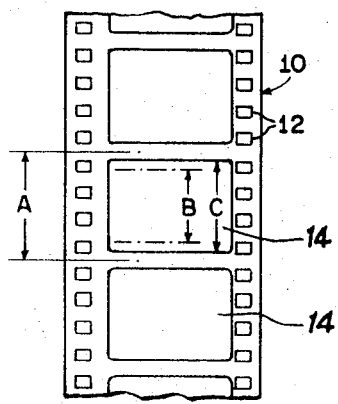

In FIG. 2 of the drawings, a photographic image 14 is shown in solid lines as having a length C, which is usually about 0.631 inches. It will be seen that the length C is less than the available length A but more than the required length B so that again the available length of film is greater than that required. The width of the image is also less than the total available width of the film and the image is slightly offset to one side. The photographic image illustrated in FIG. 2 of the drawings is produced by the conventional "academy aperture" which provides a 1.33:1 width to height ratio. The length B is again the maximum composition length required for the conventional flat wide screen presentation so that in this system both the length of the film and the length of the photograph image is greater than is actually required.

Figure 3:
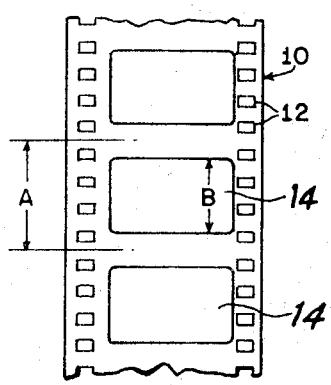

In FIG. 3 of the drawings, the required proportions of the photographic image are diagrammatically illustrated, and it will be noted that there is a very substantial difference between the required height B and the available length A of the film. As previously indicated, the available length A is equal to four perforation pitch lengths whereas the required image height B is slightly less than three perforation pitch lengths. The image which is to be projected onto the conventional wide screen of a North American motion picture theatre has a width to height ratio of the order of 1.85:1, whereas in a European theatre the conventional wide screen has a width to height ratio of the order of 1.66:1. In both the North American and European systems presently in use, a portion of the photographic image must be masked by the projector. The total longitudinal length C of the image on the conventional film is about 0.631 inches and the total length of the required projected image B is equal to 0.466 inches in the North American format and 0.497 inches in the European format.

FIGS. 4 to 8 inclusive serve to illustrate a number of embodiments of the present invention which overcome the difficulties of the prior art described above.

Figure 4:
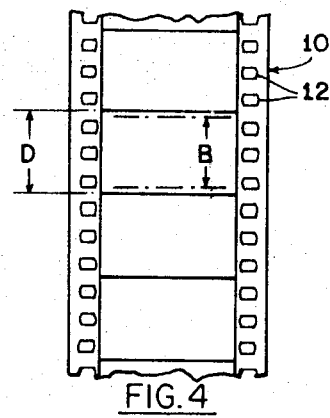
FIG. 4 is a diagrammatic plan view illustrating the area of film available for photographic images according to an embodiment of the present invention.

As illustrated in FIG. 4 of the drawings, the maximum length of film D available for a photographic image is equal to three perforation pitch lengths. As previously indicated, the maximum length of film required for the conventional photographic image is equal to the length B. As shown in FIG. 4 of the drawings, the length B is less than the length D so that the three perforation pitch lengths provide a sufficient length to accommodate the maximum length B which is required.

Figure 5:
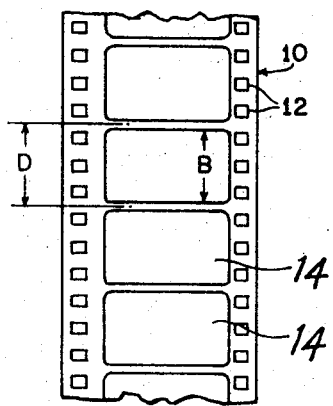
FIG. 5 is a diagrammatic plan view similar to FIG. 4 illustrating the area of the film occupied by the photographic image.

FIG. 5 differs from FIG. 4 in that it illustrates the location of actual photographic images 14 on the film and illustrates the manner in which the images are located off centre to provide sufficient space for a sound track. It will also be noted that the images 14 are longitudinally spaced from one another, the differences between the lengths B and D providing sufficient space between the images to permit cutting or splicing of the film as required. To prepare a film according to the embodiment illustrated in FIG. 5 of the drawings, a standard perforation pitch film is fed through a camera which is adapted to produce photographic images on the film having a length in the longitudinal direction of the film equal to the length B which is no greater than three perforation pitch lengths. The film is repeatedly advanced through the camera in successive lengths equal to three perforation pitch lengths and a plurality of successive scenes are photographed on successive frames to provide a plurality of photographic images each having a frame length no greater than three perforation pitch lengths.

After the film is shot, the photographic images will have the appearance of the photographic images 14 of FIG. 5 and the images will be arranged relative to one another in the manner illustrated in FIG. 5 of the drawings. The film is then edited and print films prepared from the original film.

The print film may be prepared so that it has an appearance identical to that illustrated in FIG. 5 of the drawings wherein the frame length in the direction of the longitudinal extent of the film is equal to the length B. Print films of this type are prepared in a printing machine which is adapted to advance the original film and the print film at the same speed through the printing machine so that the print film is identical to the original film. The film of this type may be projected by means of a projector which is adapted to advance the film in a series of lengths equal to three perforation pitch lengths.

By using this method of preparing an original film and a print film it is possible to achieve a 25 percent saving in the length of film required. This is achieved by reason of the fact that the length D is 25 percent less than the length A.

Figure 7:
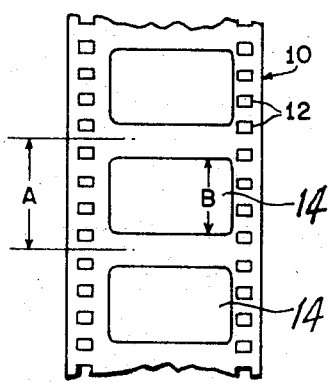
FIG. 7 is a diagrammatic plan view of a film print prepared from an original film prepared according to FIG. 5 of the invention for use in a four perforation pulldown projector.

The conventional projectors which are presently available are adapted to advance film by four perforation pitch lengths, and I have devised a method whereby it is possible to effect a 25 percent saving in the length of the film used in the preparation of the original film, while providing a print film suitable for use in the conventional four perforation pull-down projector. The print film which is suitable for use in the four perforation pull-down projector is illustrated in FIG. 7 of the drawings. It will be noted that the photographic image 14 is located centrally of a length A equal to four perforation pitch lengths. This print film is obtained by advancing the original film through a printing machine in a series of lengths measuring three perforation pitch lengths and advancing the print film through the printing machine in a series of lengths measuring four perforation pitch lengths, so that when the photographic image is transferred from the original film to the print film the spacing between images on the print film is increased to four perforation pitch lengths. The print film produced will then have the appearance of the film illustrated in FIG. 7 of the drawings, which is suitable for use in a four perforation pulldown projector. While this method does not provide a savings in the length of film used in the preparation of a print film, the 25 percent saving in the preparation of original film is maintained by employing the method of preparing the original film described above. The amount of film used in the preparation of most original films is substantially greater than that used in the preparation of the print films so that the percentage saving in film remains substantial.

Figure 6:
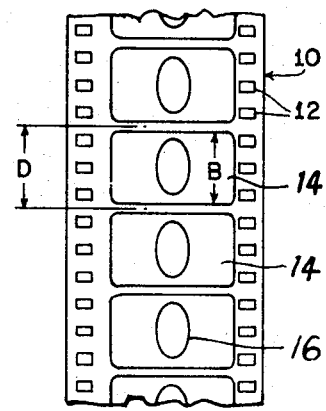
FIG. 6 is a plan view similar to FIG. 5 illustrating a photographic image prepared with a 1.5:1 horizontal anamorphic reduction.
Figure 8:
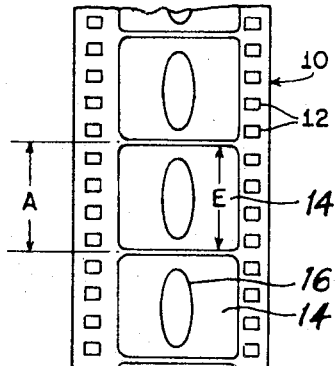
FIG. 8 is a diagrammatic plan view of a film print suitable for use in a standard four perforation pulldown projector with a 2:1 anamorphic lens prepared from a film such as that illustrated in FIG. 6.

FIGS. 6 and 8 of the drawings serve to illustrate a further embodiment of the present invention. In the preparation of the original film illustrated in FIG. 6 of the drawings the image is photographed by a lens which provides an approximately 1.5:1 horizontal anamorphic reduction. This reduction is diagrammatically illustrated in FIG. 6 of the drawings by the ellipse 16, which in a film without anamorphic reduction would be circular. Again, in the preparation of a film of this type, the 25 percent saving in the length of the original film is achieved.

For the purposes of projection on a wide screen using a conventional four perforation pitch length projector, the images on the print film must have a 2:1 horizontal anamorphic reduction. I have found that this can be achieved in a printing machine having a length system adapted to increase the longitudinal length of the image of the original film to a length E, which is then printed onto a print film centrally of a four perforation pitch length A, as illustrated in FIG. 8 of the drawings. The film illustrated in FIG. 8 of the drawings is suitable for use in a four perforation pull-down projector camera system having an anamorphic lens adapted to project a film onto a wide screen having a height to width ratio of about 2.35:1 without anamorphic distortion.

Again, while the print film illustrated in FIG. 8 of the drawings does not provide a saving in the length of print film, a 25 percent saving is effected in the preparation of the original film as described above with respect to FIG. 6 of the drawings.

The processing and finishing steps which are carried out after the original film has been photographed may include any and all of the steps normally carried out in the preparation of the finished original film including, developing, editing, preparing work prints and the like.

It will be understood that in transferring the sound track from a three perforation pitch length film to a four perforation pitch length film, allowance will be made for the variation in length of the frames so that the sound track will be synchronized with the photographic images as they pass through the projector.

A 35 mm original film prepared according to the present invention will have a plurality of photographic images of standard width located thereon on adjacent lengths of the film measuring about 0.5598 inches. Each photographic image will have a length in the longitudinal extent of the film measuring in the range of 0.446 inches to 0.5598 inches. For practical purposes, in order to space the photographic images longitudinally of the film to facilitate cutting and splicing of the film, the photographic images preferably have a length in the range of 0.446 inches to 0.550 inches.

From the foregoing it will be apparent that the present invention provides an effective saving in the amount of film used in the preparation of the original film equal to 25 percent of the film footage which would normally be used. In addition, if the film is projected in a projector having a three perforation pitch length pull-down mechanism, the length of the print film may also be reduced by 25 percent by the method described above.

The present invention also provides a method which permits an effective saving of 25 percent in the film length used in the preparation of the original film, while providing a print film having a four perforation pitch length suitable for use in conventional projectors.

These and other advantages of the method of the present invention will be apparent to those skilled in the art.

What I claim as my invention is:

1. A method of making a wide screen picture on 35mm film having a plurality of edge perforations at longitudinally spaced intervals along the length of the film having a standard perforation pitch length comprising the steps of:
  a. photographing a scene on an original film to provide photographic images having a frame length in the direction of the longitudinal extent of the film no greater than three perforation pitch lengths;
  b. repeatedly thereafter advancing said original film a distance equal to three perforation pitch lengths and photographing a plurality of successive scenes to provide successive photographic images each having a frame length no greater than three perforation pitch lengths;

c. processing and finishing said original film to provide a finished original suitable for printing; and d. subsequently preparing print films having edge perforations having the same standard pitch length by printing successive original film frame images onto said print film by successively advancing the original film in a series of lengths measuring three perforation pitch lengths and successively advancing the print film in a series of lengths measuring four pitch lengths.

2. A method as claimed in claim 1, wherein said successive original film frame images are printed without enlargement onto said successive print film lengths measuring four perforation pitch lengths, whereby the print films may be projected by conventional projectors adapted to advance print films a total of four perforation pitch lengths.

3. A method as claimed in claim 1 wherein the photographic images of the original film are anamorphic images having a horizontal reduction in the range of 1.5:1 to 1.25:1.

4. A method as claimed in claim 3 wherein said anamorphically reduced images of the original film are longitudinally stretched during the preparation of the print film on to frames of the print film measuring four perforation pitch lengths so as to provide a print film bearing anamorphically longitudinally stretched photographic images having a 2:1 horizontal anamorphic reduction ratio whereby the film may be projected by means of a conventional projector having an anamorphic optical system of a 2:1 ratio to provide a projected image without anamorphic distortion having a width to height ratio of about 2.35:1.

5. A 35mm film having a plurality of edge perforations having a standard perforation pitch length of about 0.1866 inches and the film bearing a plurality of photographic images of standard width, each image being located on adjacent lengths of the film measuring about 0.5598 inches, each image having a length in the longitudinal extent of the film measuring in the range of 0.446 inches to 0.5598 inches.

6. A 35 mm film as claimed in claim 5 wherein the length of the photographic image is in the range of 0.446 inches to 0.550 inches.

* * * * *